United States Patent [19]

Kunii et al.

[11] Patent Number: 5,058,026
[45] Date of Patent: Oct. 15, 1991

[54] ASSEMBLABILITY DISCRIMINATING METHOD AND ASSEMBLING SEQUENCE GENERATING METHOD

[75] Inventors: Toshiyasu L. Kunii, Tokyo; Tsukasa Noma, Higashiyamato; Kyujae Lee, Tokyo, all of Japan

[73] Assignee: Ricoh Company, Ltd., Japan

[21] Appl. No.: 341,202

[22] Filed: Apr. 21, 1989

[30] Foreign Application Priority Data

Apr. 27, 1988 [JP] Japan ................................ 63-105333

[51] Int. Cl.$^5$ ............................................ G06F 15/46
[52] U.S. Cl. ................................... 364/468; 364/461; 364/474.2
[58] Field of Search ................ 364/468, 474.19, 474.2, 364/474.22, 474.26, 474.24, 513, 461, 512, 522, 521, 191-193, 188, 189

[56] References Cited

U.S. PATENT DOCUMENTS

| | | | |
|---|---|---|---|
| 4,578,757 | 3/1986 | Stark | 364/461 |
| 4,736,306 | 4/1988 | Christensen et al. | 364/513 |
| 4,744,028 | 5/1988 | Karmarkar | 364/402 |
| 4,764,873 | 8/1988 | Libby | 364/474.2 X |
| 4,888,707 | 12/1989 | Shimada | 364/474.2 X |

OTHER PUBLICATIONS

Lozano-Perez et al., "An Algorithm for Planning Collision-Free Paths Among Polyhedral Obstacles", *Communications of the ACM*, Oct. 1979, vol. 22, No. 10: pp. 560-570.

Daniel Leven et al., "An Efficient and Simple Motion Planning Algorithm for a Ladder Amidst Polygonal Barriers*", *Journal of Algorithms*, vol. 8, (1987), pp. 192-215.

Michael Brady, "Artificial Intelligence and Robotics", *Artificial Intelligence*, 1985, Elsevier Science Publishers BV (North Holland), vol. 26, pp. 79-121.

Ishida et al., "Detection of Unanticipated Functions of Machines", Proc. International Symposium on Design and Synthesis, Jul. 11-13, 1984, pp. 21-26.

Lund et al., "Design for Assembly", Proc. 4th International Conference on Assembly Automation, 1983, pp. 333-349.

Miyakawa et al., "The Hitachi Assemblability Evaluation Method (AFM)", Proc. 1st International Conference on Product Design for Assembly, 1986.

M. Brady, "Artificial Intelligence and Robotics", Artificial Intelligence, vol. 26, No. 1, Apr. 1985, pp. 79-121.

Russell et al., "Design for Manufacturability", Production Research and Technology, Eighth NSF Grantee's Conference, Jan. 27-29, 1981.

Lieberman et al., "AUTOPASS: An Automatic Programming system for Computer Controlled Mechanical Assembly", IBM J. Res. Develop. vol. 21, No. 4, Jul. 1977, pp. 321-333.

Wesley et al., "A Geometric Modeling System for Automated Mechanical Assembly", IBM J. Res. Develop. vol. 24, No. 1, Jan. 1980, pp. 64-74.

Lee et al., "A Hierarchical Date Structure for Representing Assemblies: Part 1", Computer Aided Design, vol. 17, No. 1, Jan./Feb. 1985, pp. 15-19.

Lee et al., "Inference of the Positions of Components in an Assembly: Part 2", computer Aided Design, vol. 17, No. 1, Jan./Feb. 1985, pp. 20-24.

*Primary Examiner*—Joseph Ruggiero
*Attorney, Agent, or Firm*—Mason, Fenwick & Lawrence

[57] ABSTRACT

An assemblability discriminating method for discriminating an assemblability of a completed product which is made up of a plurality of parts and an assembling sequence generating method for generating an assembling sequence of the completed product employ an assembly process graph and checks validity of arcs in the assembly process graph to determine the assemblability and the assembling sequence. The validity of the arcs is checked in a disassembling sequence starting from an arc which is connected to a node which corresponds to the completed product.

24 Claims, 3 Drawing Sheets

ASSEMBLABILITY DISCRIMINATING METHOD AND ASSEMBLING SEQUENCE GENERATING METHOD

BACKGROUND OF THE INVENTION

The present invention generally relates to assemblability discriminating methods and assembling sequence generating methods, and more particularly to an assemblability discriminating method for discriminating assemblability of parts and an assembling sequence generating method for generating an assembling sequence of parts.

The present invention is applicable to computer-aided design (CAD) for computer-integrated manufacturing (CIM) using a technique called systematic decomposition of manufacturing (SYDEM) of a completed product.

Recently, more and more robots are used at various locations within a factory in combination with numerically controlled (NC) machines. With the progress in factory automation (FA), a number of workers who take part in a manufacturing process decreases. As a result, matters which do not cause any problems when a manufacturing process involves a manual operation by man often become unsolvable problems when the same manufacturing process is carried out solely by a robot. Such problems occur because the automated machines are awkward and lack adaptability and intelligence when compared with human workers. In order to overcome such problems, it is necessary that the problems which may occur during the manufacturing processes are checked and decisions are made to avoid the problems in advance, that is, in a designing stage.

The CAD is concentrated around computational geometry and especially on solid modeling which aims at defining a shape of a mechanical part. Many of the CADs for commercial use is developed based on the solid modeling. A mechanical object assembled from a plurality of parts is called an assembly. Although the assembly is essential to the product manufacturing, research on the designing of the assembly is less active when compared to research related to the solid modeling.

Ishida et al., "Detection of Unanticipated Functions of Machines", Proc. International Symposium on Design and Synthesis, July 11–13, 1984, pp.21–26 discusses the assemblability of machines as disassemblability of machines. However, according to the method proposed in Ishida et al., only the machine per se is considered and no consideration is given on an assembling environment.

On the other hand, Lund et al., "Design for Assembly", Proc. 4th International Conference on assembly Automation, 1983, pp.333–349 proposes a rational design for the assembly, but the design according to this method is based on experience for facilitating the assembling and makes no evaluation of a particular design.

Accordingly, Miyakawa et al., "The Hitachi Assemblability Evaluation Method (AEM)", Proc. 1st International Conference on Product Design for Assembly, 1986 proposed a method of evaluating the assemblability of a particular design, but this method also does not consider a particular assembling environment.

On the other hand, M. Brady, "Artificial Intelligence and Robotics", Artificial Intelligence, Vol.26, No.1, April 1985, pp.79–121 discusses a path-detection technique. This path-detection technique is used to generate an operation of an arm of a robot which assembles a part on a semi-completed product which is placed on a base under a particular environment. However, this technique is merely a simulation of assembling parts. There is no suggestion to combine the path-detections to discriminate the assemblability and to generate the assembling sequence.

SUMMARY OF THE INVENTION

Accordingly, it is a general object of the present invention to provide novel and useful assemblability discriminating method and assembling sequence generating method in which the problems described above are eliminated.

Another and more specific object of the present invention is to provide an assemblability discriminating method for discriminating an assemblability of a completed product which is made up of a plurality of parts, comprising the steps of making an assembly process graph $G = (N, A)$ which satisfies conditions (1) and (2) from a set P of the parts of the completed product, where N denotes a set of nodes and A denotes a set of arcs, $$N = =\{P1, \ldots, Pm\}; Pi \epsilon P, m \geq 1\} \quad (1)$$

$$A = (\{P1, \ldots, Pk\}, \{P1, \ldots, Pk, Pk+1\}) \quad (2)$$

each node corresponding to any of one part, a semi-completed product which is made up of a plurality of parts and the completed product, each arc connecting two nodes, discriminating validity of each arc by starting from an arc which is connected to a node which corresponds to the completed product and continuing in a sequence with priority on a depth of the assembly process graph G, each arc ($\{P1, \ldots, Pk\}, \{`, \ldots, Pk, Pk+1\}$) being discriminated as a valid arc when a part $Pk+1$ is assemblable on a semi-completed product made up of parts $P1, \ldots, Pk$ under a predetermined assembling environment and otherwise being discriminated as an invalid arc, and discriminating the assemblability of the completed product when there exists at least one path of valid arcs connecting a node which corresponds to one part to the node which corresponds to the completed product and otherwise discriminating non-assemblability of the completed product. According to the assemblability discriminating method of the present invention, it is possible to discriminate the assemblability of the completed product by considering the actual assembling environment, and the assemblability can be discriminated quickly because the validity of the arcs are discriminated by starting from the arc which is connected to the node which corresponds to the completed product and continuing in the sequence with priority on the depth of the assembly process graph G.

Still another object of the present invention is to provide an assemblability discriminating method for discriminating an assemblability of a completed product which is made up of a plurality of parts, comprising the steps of making an assembly process graph $G=(N, A)$ which satisfies conditions (1) and (2) from a set P of the parts of the completed product, where N denotes a set of nodes and A denotes a set of arcs, and initially marking all arcs in the assembly process graph G "undetermined", $$N=\{\{P1, \ldots, Pm\}; Pi \epsilon P, m \geq 1\} \quad (1)$$

$$A = (\{P1, \ldots, Pk\}, \{P1, \ldots, Pk, Pk+1\}) \quad (2),$$

calculating a logic function check(P) when a logic function check(X) is defined as follows with respect to a set X of parts which are to be assembled, $$\text{check}(X) \equiv \begin{cases} \bigvee_{x \in X} \{\text{check}(X - \{x\}) \land \text{valid}(X, x)\} & (|X| \geq 2) \\ \text{true} \ (|X| = 1) \end{cases}$$

where symbols "$\vee$" and "$\wedge$" respectively denote a logical sum and a logical product, X denotes a number of elements of the set X, and a logic function valid(X,x) is true when an arc $(X-\{x\},X)$ is valid and is false when the arc $(X-\{x\},X)$ is invalid, and discriminating that the completed product is assemblable when a value of the logic function check(P) is true and is not assemblable when the value of the logic function check(P) is false.

A further object of the present invention is to provide an assembling sequence generating method for generating an assembling sequence of a completed product which is made up of a plurality of parts, comprising the steps of making an assembly process graph G=(N, A) which satisfies conditions (1) and (2) from a set P of the parts of the completed product, where N denotes a set of nodes and A denotes a set of arcs, $$N = \{\{P1, \ldots, Pm\}; Pi \in P, m \geq 1\} \quad (1)$$

$$A = (\{P1, \ldots, Pk\}, \{P1, \ldots, Pk, Pk+1\}) \quad (2)$$

each node corresponding to any of one part, a semi-completed product which is made up of a plurality of parts and the completed product, each arc connecting two nodes, discriminating validity of each arc by starting from an arc which is connected to a node which corresponds to the completed product and continuing in a sequence with priority on a depth of the assembly process graph G, each arc ($\{P1, \ldots, Pk\}, \{P1, \ldots, Pk, Pk+1\}$) being discriminated as a valid arc when a part Pk+1 is assemblable on a semi-completed product made up of parts P1, ..., Pk under a predetermined assembling environment and otherwise being discriminated as an invalid arc, discriminating at least one path of valid arcs connecting a node which corresponds to one part to the node which corresponds to the completed product, and generating an assembling sequence from the path of valid arcs, the assembling sequence starting from a node which corresponds to one part and ending at the node which corresponding to the completed product. According to the assembling sequence generating method of the present invention, it is possible to generate the assembling sequence of the completed product by considering the actual assembling environment, and the assembling sequence can be generated quickly because the validity of the arcs are discriminated by starting from the arc which is connected to the node which corresponds to the completed product and continuing in the sequence with priority on the depth of the assembly process graph G.

Another object of the present invention is to provide an assembling sequence generating method for generating an assembling sequence of a completed product which is made up of a plurality of parts, comprising the steps of making an assembly process graph G=(N, A) which satisfies conditions (1) and (2) from a set P of the parts of the completed product, where N denotes a set of nodes and A denotes a set of arcs, and initially marking all arcs in the assembly process graph G "undetermined", $$N = \{\{P1, \ldots, Pm\}; Pi \in P, m \geq 1\} \quad (1)$$

$$A = (\{P1, \ldots, Pk\}, \{P1, \ldots, Pk, Pk+1\}) \quad (2),$$

calculating a logic function check(P) when a logic function check(X) is defined as follows with respect to a set X of parts which are to be assembled, $$\text{check}(X) \equiv \begin{cases} \bigvee_{x \in X} \{\text{check}(X - \{x\}) \land \text{valid}(X, x)\} & (|X| \geq 2) \\ \text{true} \ (|X| = 1) \end{cases}$$

where symbols " " and " " respectively denote a logical sum and a logical product, $|X|$ denotes a number of elements of the set X, and a logic function valid(X,x) is true when an arc $(X-\{x\},X)$ is valid and is false when the arc $(X-\{x\},X)$ is invalid, discriminating that the completed product is assemblable when a value of the logic function check(P) is true and is not assemblable when the value of the logic function check(P) is false, obtaining at least one path of valid arcs connecting a node which corresponds to one part to the node which corresponds to the completed product, and generating an assembling sequence from the path of valid arcs, the assembling sequence starting from a node which corresponds to one part and ending at the node which corresponding to the completed product.

Other objects and further features of the present invention will be apparent from the following detailed description when read in conjunction with the accompanying drawings.

DETAILED DESCRIPTION

Figure 1:
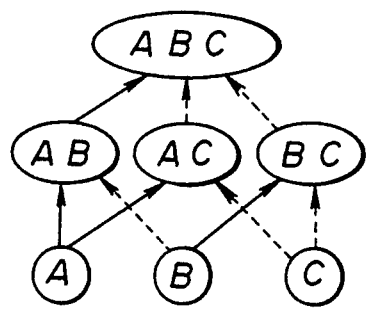
FIG. 1 is an assembly process graph for explaining a first embodiment of an assemblability discriminating method and an assembling sequence generating method according to the present invention.

In view of the fact that the deficiencies of the conventional assemblability discriminating method and assembling sequence generating method are due to giving no consideration on the actual assembling environment and treating not the entire simulation but simply the assembling of parts in the case of the path-detection technique which considers the assembling environment, the present invention provides an assemblability discriminating method and an assembling sequence generating method which consider the actual assembling environment. In order to discriminate the assemblability and generate the assembling sequence by considering the actual assembling environment, a discrimination is made to determine whether or not a part is assemblable on a semi-completed product to form another semi-completed or completed product. For example, the path-detection method may be employed for the discrimination. When a part of a machine is assemblable on another part or semi-completed product and such an assemblable combination forms a path from one part to the completed product, this machine is assemblable and the path describes the assembling sequence. When no such path exists from one part to the completed product, the machine is not assemblable.

When a set of machine parts is denoted by P, an assembly process of the machine can be described by an assembly process graph $G=(N, A)$ which satisfies the following conditions (1) and (2), where N denotes a set of nodes and A denotes a set of arcs.

$$N = \{P1, \ldots, Pm\}; Pi \in P, m \geq 1 \quad (1)$$

$$A = (\{P1, \ldots, Pk\}, \{P1, \ldots, Pk, Pk+1\}) \quad (2)$$

Because an arc $(\{P1, \ldots, Pk\}, \{P1, \ldots, Pk, Pk+1\})$ corresponds to an assembly step in which a part $Pk+1$ is assembled on a semi-completed product (subassembly) made up of the parts $P1, \ldots, Pk$, a "valid arc" can be defined as follows.

That is, an arc $(\{P1, \ldots, Pk\}, \{P1, \ldots, Pk, Pk+1\})$ of the assembly process graph G is called a "valid arc" when the part $Pk+1$ is assemblable on the semi-completed product which is made up of the parts $P1, \ldots, Pk$ via a collision-free path. The arc is otherwise an "invalid arc".

A node in the assembly process graph G describes a semi-completed or completed product, and an arc in the assembly process graph G indicates a unit assembly operation such as the conventional path-detection. When the path-detection technique is applied to each arc for the sake of convenience, it is possible to label the arc "valid" when the parts are assemblable and otherwise label the arc "invalid". In other words, the existence of a path which is constituted by a valid arc from a node describing one part to another node describing another part (or semi-completed product) indicates the assemblability of the one part and the other part (or semi-completed product). Further, the existence of a path which is constituted by a valid arc from one node describing one part to another node describing a completed product indicates the assemblability of the completed product, and the path from the one node to the other node indicates one assembling sequence. When a plurality of such paths exist, there are a plurality of assembling sequences.

Figure 2:
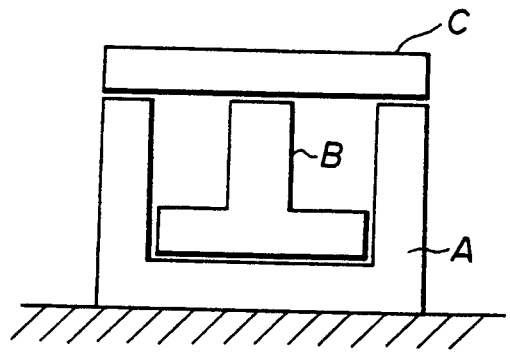
FIG. 2 is a side view of parts for explaining the first embodiment.

FIG. 1 is an assembly process graph for explaining a first embodiment of an assemblability discriminating method and an assembling sequence generating method according to the present invention, and FIG. 2 is a side view of parts for explaining the first embodiment. In this embodiment, it is assumed for the sake of convenience that a completed product $\{A,B,C\}$ shown in FIG. 2 is to be assembled from parts A, B and C. In FIG. 1, the assembly process graph G has seven nodes and nine arcs, and a valid arc is indicated by a solid line while an invalid arc is indicated by a broken line.

When an arm of a robot is adapted to the assembling process for the completed product $\{A,B,C\}$, the part B is assemblable on the part A and an arc $(\{A\},\{A,B\})$ is a valid arc. Similarly, the part C is assemblable on the semi-completed product $\{A,B\}$, and an arc $(\{A,B\},\{A,B,C\})$ is also a valid arc. In other words, a path $\{A\}$-$\{A,B\}$-$\{A,B,C\}$ is a valid path made up of valid arcs from a node of one part to a node of the competed product, and the completed product $\{A,B,C\}$ is thus assemblable. In addition, the assembling sequence in this case is A-B-C.

In order to find a valid path which indicates the assembling sequence, it is important to determine the sequence in which the validity of the arcs are discriminated. In this embodiment, it is thus important to determine the sequence in which the path-detection is applied to the arcs. Generally, a search with priority on the depth (depth-first search) involves a back-tracking. But when a part is not assemblable on an semi-completed product, that is, when an arc in the assembly process graph is an invalid arc, a main reason that this occurs is due to an interference or collision of the part, the semi-completed product, the assembling machine such as the robot and the like. When it is noted that the asembling environment which mainly affects the validity of the arc is the interference or collision, it is possible to avoid the back-tracking.

When it is assumed for the sake of convenience that the interference or collision of the parts and the assembling machine is the only cause which makes the arc invalid, a relation stands such that an arc $(\{P1, \ldots, Pk, Pk+2\},\{P1, \ldots, Pk, Pk+1, Pk+2\})$ is an invalid arc if an arc $(=P1, \ldots, Pk\}, \{P1, \ldots, Pk, Pk+1\})$ is an invalid arc. When this relation is applied an appropriate number of times, it may be derived that an invalid arc is always included in a path from a node of one part to a node of the competed product in the assembly process graph if all of the k arcs under a node $\{P1, \ldots, Pk\}$ are invalid arcs. This indicates that the back-tracking does not occur when the search with the priority on the depth is carried out from the top node of the assembly process graph, that is, from the node of the completed product.

Figure 3:
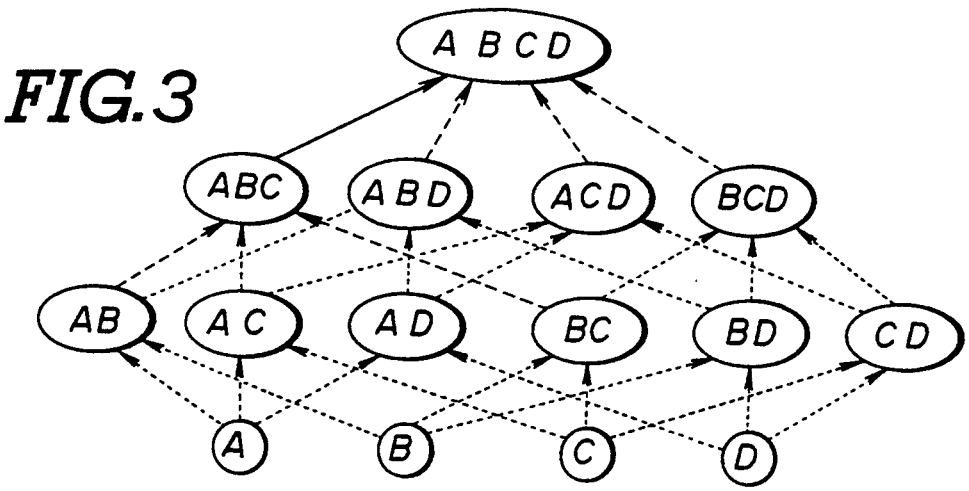
FIG. 3 is an assembly process graph for explaining a second embodiment of the assemblability discriminating method and the assembling sequence generating method according to the present invention.
Figure 4:
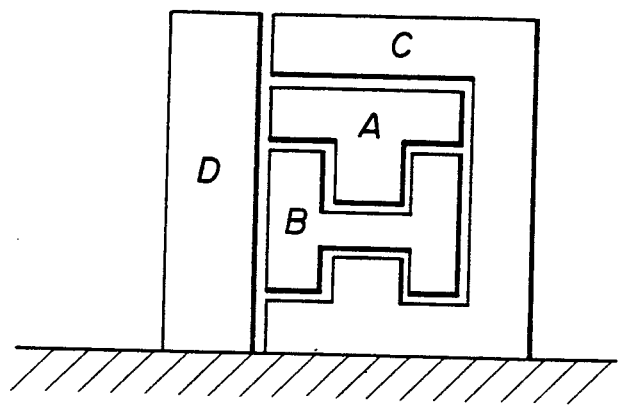
FIG. 4 is a side view of parts for explaining the second embodiment.

FIG. 3 is an assembly process graph for explaining a second embodiment of an assemblability discriminating method and an assembling sequence generating method according to the present invention, and FIG. 4 is a side view of parts for explaining the second embodiment. In this embodiment, it is assumed for the sake of convenience that a completed product $\{A,B,C,D\}$ is to be assembled from parts A, B, C and D. As may be seen from FIG. 3, it is possible to advance downwardly from a node of the completed product $\{A,B,C,D\}$ to a node of a semi-completed product $\{A,B,C\}$, but it is impossible to further advance downwardly from the node of the semi-completed product $\{A,B,C\}$ and the completed product $\{A,B,C,D\}$ of this embodiment is not assemblable. The invalidity of the arc $(\{A,B,D\}, \{A,B,C,D\})$ can be detected from the invalidity of the arc $(\{A,B\},\{A,B,C\})$. The invalidity of the arc $(\{A,C,D\}, \{A,B,C,D\})$ can be detected from the invalidity of the arc $(\{A,C\},\{A,B,C\})$. In addition, the invalidity of the arc $(\{B,C,D\}, \{A,B,C,D\})$ can be detected from the invalidity of the arc $(\{B,C\}, \{A,B,C\})$.

When the total number of parts is denoted by n and the search with the priority on the depth is carried out from the top of the assembly process graph in the disassembling sequence, a number of discriminations to determine the assemblability, that is, a number of arcs applied with the path-detection technique for generating one kind of assembling sequence in the case of the described embodiments, is O(n²) in a worst case. In other words, a maximum value of the number is O(n²). The number of discriminations which must be made in the conventional case where the search with the priority on the depth is carried out from the bottom of the assembly process graph in the assembling sequence is O(2ⁿ) in the worst case, and it is seen that the number of discriminations carried out in the described embodiments becomes considerably less compared to the conventional case as the value of n increases.

Therefore, the assemblability can be discriminated and the assembling sequence can be generated quickly because the unit assembly simulation is made in the disassembling sequence and not in the assembling sequence.

Next, a description will be given of a third embodiment of the assemblability discriminating method according to the present invention, by referring to flow charts of FIGS. 5 and 6.

When a logic function check(X) is defined as follows with respect to a set X of parts which are to be assembled, the assemblability discrimination is equivalent to obtaining a value of check (P), where P is a set of all of the parts which constitute a completed product such as a machine.

$$\text{check}(X) \equiv \begin{cases} \bigvee_{x \in X} \{\text{check}(X - \{x\}) \land \text{valid}(X, x)\} & (|X| \geq 2) \\ \text{true} & (|X| = 1) \end{cases}$$

In the above definition, symbols "∨" and "∧" respectively denote a logical sum and a logical product, and |X| denotes a number of elements of the set X. A logic function valid (X,x) is true when an arc (X−{x},X) is valid and is false when the arc (X−{x},X) is invalid.

Figure 5:
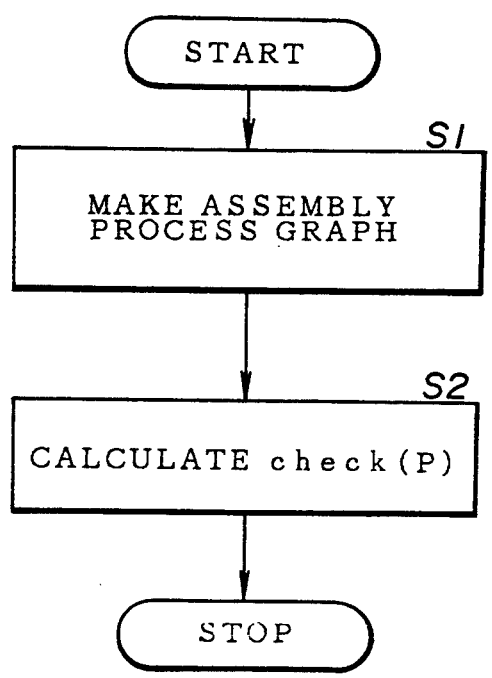
FIGS. 5 and 6 are flow charts for explaining a third embodiment of the assemblability discriminating method according to the present invention.

FIG. 5 shows a flow chart of the third embodiment. In FIG. 5, a step S1 makes an assembly process graph from the set P and marks all arcs in the assembly process graph "undetermined". All arcs are initially marked "undetermined" so that it is possible to distinguish these arcs from arcs which are discriminated as being valid or invalid arcs. Then, a step S2 calculates the logic function check(P). The completed product is assemblable when the value of the logic function check(P) is true, and is not assemblable when the value of the logic function check(P) is false.

Figure 6:
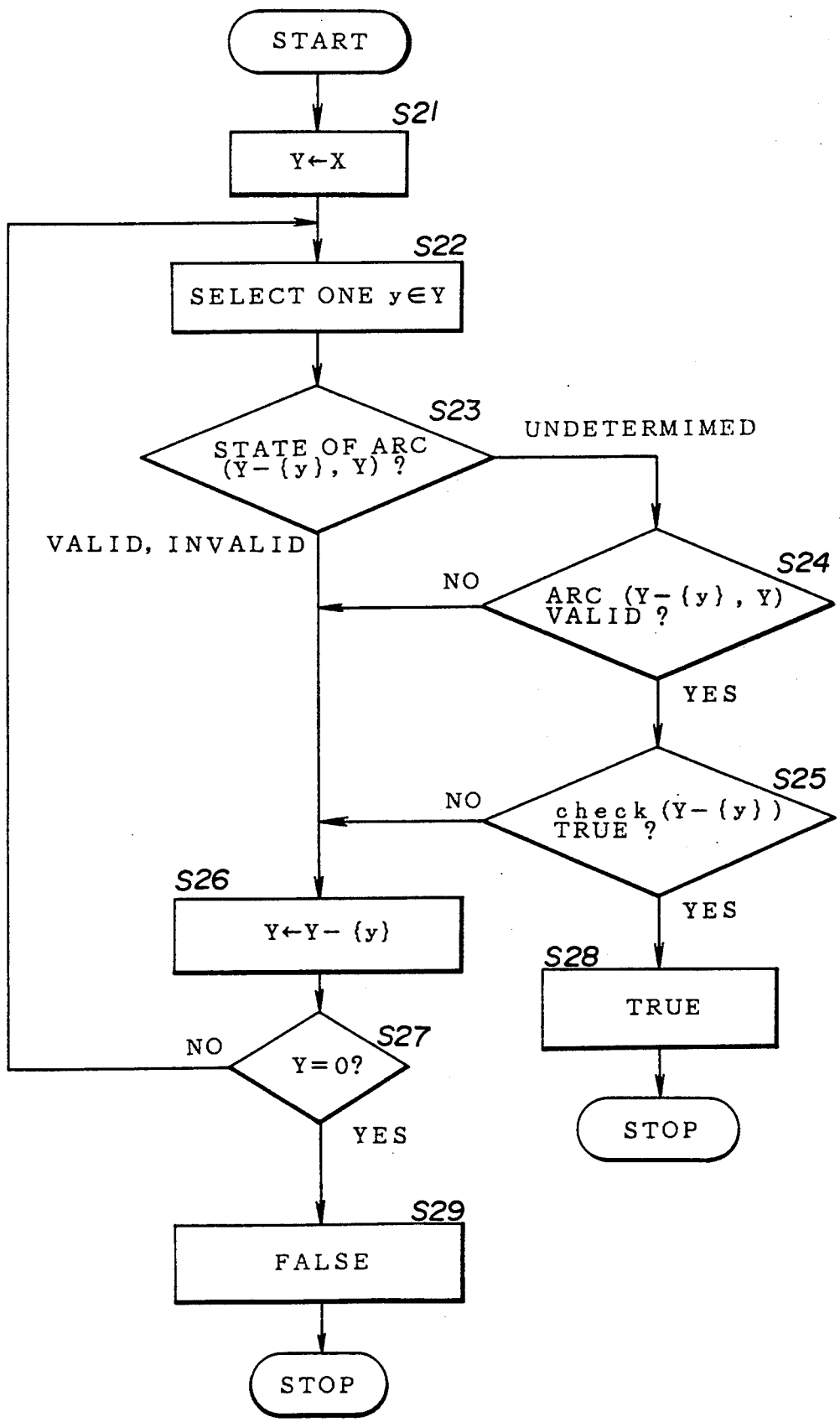

FIG. 6 shows a flow chart of an embodiment of processes carried out by the step S2. In FIG. 6, a step S21 substituted X into Y which is a variable having a set of parts as a value. A step S22 selects one Y∈Y, and a step S23 discriminates a state of an arc (Y−{y},Y). The step S23 does not discriminate the validity of the arc (Y−{y},Y) by actually carrying out a simulation or the like. When the arc (Y−y,Y) is discriminated as being "undetermined" in the step S23, a step S24 actually discriminates whether or not the arc (Y−{y},Y) is valid. When the discrimination result in the step S24 is YES, a step S25 discriminates whether or not the logic function check(Y−{y},Y) is true. The step S25 carries out a recursive calculation. When the discrimination result in the step S25 is YES, a step S28 outputs a result "true".

One of the notable advantages of the present invention can be seen from this embodiment in that a number of times the step S24 is carried out is considerably reduced when compared with a number of times a corresponding step is carried out in the conventional case. When the arc (Y−{y},Y) is discriminated as being "invalid" and the reason therefore is due to the interference or collision of the parts, assembling machine and the like, all arcs (Y+Z−{y},Y+Z) are discriminated as being "invalid" with respect to an arbitrary set Z of parts, where Z∈P−Y.

On the other hand, when the arc (Y−{y},Y) is discriminated as being "valid" or "invalid" in the step S23, a step S26 substitutes Y−{y} into Y. The step S26 is carried out also when the discrimination result in the step S24 or S25 is NO. After the step S26, a step S27 discriminates whether or not Y=0. The process returns to the step S22 when the discrimination result in the step S27 is NO. But when the discrimination result in the step S27 is YES, a step S29 outputs a result "false".

The result "true" of the step S28 and the result "false" of the step S29 are outputted as the value of the logic function check(X).

Further, the present invention is not limited to these embodiments, but various variations and modifications may be made without departing from the scope of the present invention.

What is claimed is:

1. An industrial process including a computer-automated assemblability determination method for determining an assemblability of a completed product which is made up of a plurality of parts, the process comprising the steps of:

(a) producing information defining physical shapes of the parts using a computer aided design (CAD) system, the parts being part of a set P;

(b) inputting the information from the CAD system;

(c) making an assembly process structure G=(N,A) which satisfies conditions (1) and (2) from the set P of the parts of the completed product, where N denotes a set of nodes and A denotes a set of arcs, $$N = \{\{P1, \ldots, Pm\}; Pi \in P, m \geq 1\} \quad (1)$$

$$A = (\{P1, \ldots, Pk\}, \{P1, \ldots, Pk, Pk+1\}) \quad (2)$$

each node corresponding to any of: (1) one part, (2) a semi-completed product which is made up of a plurality of parts, or (3) the completed product, each arc connecting two nodes;

(d) determining validity of each arc by starting from an arc which is connected to a node which corresponds to the completed product and continuing in a sequence with priority on a depth of the assembly process structure G, each arc ({P1, ..., Pk}, {P1, ..., Pk, Pk+1}) being determined to be a valid arc when a part Pk+1 is assemblable on a semi-completed product made up of parts P1, ..., Pk under a predetermined assembling environment and otherwise being determined to be an invalid arc;

(e) determining the assemblability of the completed product when there exists at least one path of valid arcs connecting a node which corresponds to one part to the node which corresponds to the completed product and otherwise determining the non-assemblability of the completed product; and (f) when the completed product is determined to be assemblable:

(1) outputting an assemblability decision to a device for generating an assembly sequence for use in a computer integrated manufacturing (CIM) device; and (2) assembling the product according to the assembly sequence, using the CIM device.

2. The computer-automated assemblability determination method as claimed in claim 1 wherein said step of determining validity of each arc comprises:

determining that each arc ($\{P1, \ldots, Pk\}, \{P1, \ldots, Pk, Pk+1\}$) is a valid arc when the part $Pk+1$ is assemblable on the semi-completed product made up of the parts $P1, \ldots, Pk$ via a collision-free path and otherwise is an invalid arc.

3. The computer-automated assemblability determination method as claimed in claim 2 wherein said collision-free path is a path in which no collision takes place among any of the parts, semi-completed parts or an assembling machine which assembles the completed product.

4. The computer-automated assemblability determination method as claimed in claim 1 wherein said step of determining validity of each arc comprises:

determining the validity of each arc in a disassembly starting from the arc which is connected to the node which corresponds to the completed product.

5. The computer-automated assemblability determination method as claimed in claim 1 wherein said step of determining validity of each arc comprises:

determining the validity of each arc by employing a path-detection method.

6. An industrial process including a computer-automated assemblability determination method for determination an assemblability of a completed product which is made up of a plurality of parts, the process comprising the steps of:

(a) producing information defining physical shapes of the parts using a computer aided design (CAD) system, the parts being part of a set P;

(b) inputting the information from the CAD system;

(c) making an assembly process structure $G = (N, A)$ which satisfies conditions (1) and (2) from the set P of the parts of the completed product, where N denotes a set of nodes and A denotes a set of arcs, and initially marking all arcs in said assembly process structure G "undetermined", $$N = \{\{P1, \ldots, Pm\}; Pi \epsilon P, m \geq 1\} \quad (1)$$

$$A = (\{P1, \ldots, Pk\}, \{P1, \ldots, Pk, Pk+Pl\}) \quad (2l);$$

(d) calculating a logic function check(P) when a logic function check(X) is defined as follows with respect to a set X of parts which are to be assembled, $$\text{check}(X) \equiv \begin{cases} \bigvee_{x \epsilon X} \{\text{check}(X - \{x\}) \quad \text{valid}(x, x)\} \wedge (|X| \geq 2) \\ \text{true} \quad (|X| = 1) \end{cases}$$

where symbols "$\vee$" and "$\wedge$" respectively denote a logical sum and a logical product, $|X|$ denotes a number of elements of the set X, and a logic function valid(X,x) is true when an arc $(X-\{x\},X)$ is valid and is false when the arc $(X-\{x\},X)$ is invalid;

(e) determining that the completed product is assemblable when a value of the logic function check(P) is true and is not assemblable when the value of the logic function check(P) is false; and (f) when the completed product is determined to be assemblable:

(1) outputting an assemblability decision to a device for generating an assembly sequence for use in a computer integrated manufacturing (CIM) device; and (2) assembling the product according to the assembly sequence, using the CIM device.

7. The computer-automated assemblability determination method as claimed in claim 6 wherein said determining step comprises:

determining the assemblability of the completed product from a validity f each arc, each arc ($\{P1, \ldots, Pk\}, \{P1, \ldots, Pk, Pk+1\}$) being determined to be a valid arc when a part $Pk+1$ is assemblable on a semi-completed product made up of parts $P1, \ldots, Pk$ under a predetermined assembling environment and otherwise being determined to be an invalid arc.

8. The computer-automated assemblability determination method as claimed in claim 7 wherein said determining step comprises:

determining that each arc ($\{P1, \ldots, Pk\}, \{P1, \ldots, Pk, Pk+1\}$) is a valid arc when the part $Pk+1$ is assemblable on the semi-completed product made up of the parts $P1, \ldots, Pk$ via a collision-free path and otherwise is an invalid arc.

9. The computer-automated assemblability determination method as claimed in claim 8 wherein said collision free path is a path in which no collision takes place among any of the parts, semicompleted parts or an assembling machine which assembles the completed product.

10. The computer-automated assemblability determination method as claimed in claim 6 wherein said determining step comprises:

determining the validity of each arc in a disassembly starting from the arc which is connected to the node which corresponds to the completed product.

11. The computer-automated assemblability determination method as claimed in claim 6 wherein said determining step comprises:

determining the validity of each arc by employing a path-detection method.

12. The computer-automated assemblability determination method as claimed in claim 6 wherein said calculating step comprises:

calculating a value of a logic function valid(X,x) as being true when an arc $(X-\{x\},X)$ is valid as being false when the arc $(X-\{x\},X)$ is invalid.

13. An industrial process including a computer-automated assembly sequence generating method for generating an assembly sequence of a completed product which is made up of a plurality of parts, the process comprising the steps of:

(a) producing information defining physical shapes of the parts using a computer aided design (CAD) system, the parts being part of a set P;

(b) inputting the information from the CAD system;

(c) making an assembly process structure $G = (N, A)$ which satisfies conditions (1) and (2) from the set P of the parts f the completed product, where N denotes a set of nodes and A denotes a set of arcs, $$N = \{\{P1, \ldots, Pm\}; Pi \epsilon P, m \geq 1\} \quad (1)$$

$$A = (\{P1, \ldots, Pk\}, \{P1, \ldots, Pk, Pk+1\}) \quad (2)$$

each node corresponding to: any of (11) one part, (2) a semi-completed product which is made up of a plurality of parts, or (3) the completed product, each arc connecting two nodes;

(d) determining validity of each arc by starting from an arc which is connected to a node which corresponds to the completed product and continuing in a sequence with priority on a depth of the assembly process structure G; each arc ($\{P1, \ldots, Pk\}$, $\{P1, \ldots, Pk, Pk+1\}$) being determined to be a valid arc when a part $Pk+1$ is assemblable on a semi-completed product made up of parts $P1, \ldots, Pk$ under a predetermined assembling environment and otherwise being determined to be an invalid arc; and (e) determining at least one path of valid arcs connecting a node which corresponds to one part to the node which corresponds to the completed product;

(f) generating an assembly sequence from the path of valid arcs, said assembly sequence starting from a node which corresponds to one part and ending at the node which corresponds to the completed product;

(g) outputting the assembly sequence to a computer integrated manufacturing (CIM) device; and (h) assembling the product according to the assembly sequence, using the CIM device.

14. The computer-automated assembly sequence generating method as claimed in claim 13 wherein said step of determining validity of each arc comprises:

determining that each arc ($\{P1, \ldots, Pk\}, \{P1, \ldots, Pk, Pk+1\}$) is a valid arc when the part $Pk+1$ is assemblable on the semi-completed product made up of the parts $P1, \ldots, Pk$ via a collision-free path and otherwise is an invalid arc.

15. The computer-automated assembly sequence generating method as claimed in claim 14 wherein said collision-free path is a path in which no collision takes place among any of the parts, semicompleted parts or an assembling machine which assembles the completed product.

16. The computer-automated assembly sequence generating method as claimed in claim 13 wherein said step of determining validity of each arc comprises:

determining the validity of each arc in a disassembly starting from the arc which is connected to the node which corresponds to the completed product.

17. The computer-automated assembly sequence generating method as claimed in claim 13 wherein said step of determining validity of each arc comprises:

determining the validity of each arc by employing a path-detection method.

18. An industrial process including a computer-automated assembly sequence generating method for generating an assembly sequence of a completed product which is made up of a plurality of parts, the process comprising the steps of:

(a) producing information defining physical shapes of the parts using a computer aided design (CAD) system, the parts being part of a set P;

(b) inputting the information from the CAD system;

(c) making an assembly process structure $G = (N, A)$ which satisfies conditions (1) and (2) from the set P of the parts of the completed product, where N denotes a set of nodes and A denotes a set of arcs, and initially marking all arcs in said assembly process structure G "undetermined", $$N = \{\{P1, \ldots, Pm\}; Pi \in P, m \geq 1\} \quad (1)$$

$$A = (\{P1, \ldots, Pk\}, \{P1, \ldots, Pk, Pk+1\}) \quad (2);$$

(d) calculating a logic function check(P) when a logic function check(X) is defined as follows with respect to a set X of parts which are to be assembled, $$\text{check}(X) = \begin{cases} \bigvee_{x \in X} \{\text{check}(X - \{x\}) \quad \text{valid}(X, x)\} \land (|X| \geq 2) \\ \text{true} \quad (|X| = 1) \end{cases}$$

where symbols "$\lor$" and "$\land$" respectively denote a logical sum and a logical product, $|X|$ denotes a number of elements of the set X, and a logic function valid(X,x) is true when an arc $(X - \{x\}, X)$ is valid and is false when the arc $(X - \{x\}, X)$ is invalid;

(e) determining that the completed product is assemblable when a value of the logic function check(P) is true and is not assemblable when the value of the logic function check(P) is false;

(f) obtaining at least one path of valid arcs connecting a node which corresponds to one part to the node which corresponds to the completed product;

(g) generating an assembly sequence from the path of valid arcs, said assembly sequence starting from a node which corresponds to one part and ending at the node which corresponds to the completed product;

(h) outputting the assembly sequence to a computer integrated manufacturing (CIM) device; and (i) assembling the product according to the assembly sequence, using the CIM device.

19. The computer-automated assembly sequence generating method as claimed in claim 18 wherein said determining step comprises:

determining the assemblability of the completed product from a validity of each arc, each arc ($\{P1, \ldots, Pk\}, \{P1, \ldots, Pk, Pk+1\}$) being determined to be a valid arc when a part $Pk+1$ is assemblable on a semi-completed product made up of parts $P1, \ldots, Pk$ under a predetermined assembling environment and otherwise being determined to be an invalid arc.

20. The computer-automated assembly sequence generating method as claimed in claim 19 wherein said determining step comprises:

determining that each arc ($\{P1, \ldots, Pk\}, \{P1, \ldots, Pk, Pk+1\}$) is a valid arc when the part $Pk+1$ is assemblable on the semi-completed product made up of the parts $P1, \ldots, Pk$ via a collision-free path and otherwise is an invalid arc.

21. The computer-automated assembly sequence generating method as claimed in claim 20 wherein said collision free path is a path in which no collision takes place among any of the parts, semicompleted parts or an assembling machine which assembles the completed product.

22. The computer-automated assembly sequence generating method as claimed in claim 18 wherein said determining step comprises:

determining the validity of each arc in a disassembly starting from the arc which is connected to the node which corresponds to the completed product.

23. The computer-automated assembly sequence generating method as claimed in claim 18 wherein said determining step comprises:
determining the validity of each arc by employing a path-detection method.

24. The computer-automated assembly sequence generating method as claimed in claim 18 wherein said calculating step comprises:
calculating a value of a logic function valid(X,x) as being true when an arc (X−{x},X) is valid and as being false when the arc (X−{x},X) is invalid.

* * * * *